United States Patent
Lynch (10) Patent No.: US 9,848,579 B2
(45) Date of Patent: Dec. 26, 2017

(54) SYSTEM FOR HOLDING AND DRYING TENNIS AND OTHER BALLS, AND DOG TOY

(71) Applicant: Marirose Charlene Lynch, Eastham, MA (US)

(72) Inventor: Marirose Charlene Lynch, Eastham, MA (US)

(*) Notice: Subject to any disclaimer, the term of this patent is extended or adjusted under 35 U.S.C. 154(b) by 166 days.

(21) Appl. No.: 14/701,211

(22) Filed: Apr. 30, 2015

(65) Prior Publication Data

US 2016/0242390 A1  Aug. 25, 2016

Related U.S. Application Data

(60) Provisional application No. 62/118,968, filed on Feb. 20, 2015.

(51) Int. Cl.

| | |
|---|---|
| *A01K 29/00* | (2006.01) |
| *B65D 85/20* | (2006.01) |
| *B65D 85/00* | (2006.01) |
| *A01K 15/02* | (2006.01) |
| *A63B 47/00* | (2006.01) |

(Continued)

(52) U.S. Cl.
CPC ............ *A01K 15/025* (2013.01); *A63B 47/00* (2013.01); *A63B 47/001* (2013.01); *A63B 57/20* (2015.10); *A63B 2047/043* (2013.01); *A63B 2071/0625* (2013.01); *A63B 2102/02* (2015.10); *A63B 2102/32* (2015.10); *A63B 2208/14* (2013.01);

(Continued)

(58) Field of Classification Search
USPC ......... 119/707–711, 702; D30/160; 224/919; 206/315.9, 315.1
See application file for complete search history.

(56) References Cited

U.S. PATENT DOCUMENTS 1,861,948 A * 6/1932 Barkdoll .............. A63B 39/025
   206/315.9
2,863,307 A * 12/1958 Donle .................. A44C 25/004
   63/19

(Continued)

*Primary Examiner* — Andrea Valenti
(74) *Attorney, Agent, or Firm* — CUSPA Technology Law Associates; Yi Li (57) ABSTRACT

A ball, sphere or article holding system includes a first hollow semi-hemisphere or shell formed of a resilient material and having therein a plurality of apertures, the semi-hemisphere or shell including a first hinge element and, diametrically opposed, a first selectable closure element. The system also includes a second hollow semi-hemisphere or shell formed of a resilient material and also having a plurality of apertures, the second semi-hemisphere or shell including a second hinge element which is complementally proportioned, disposed and engagable relative to the first hinge element. Diametrically opposed therefrom is a second closure element which is complementally and press or snap-fittably engagable by the opposing closure element of the first semi-hemisphere or shell. Closure between the responsive closure elements may be enhanced by the use of a ring slip-fittably passing between complementally disposed apertures within and between the closure elements. The surface of an article held within the system is offset from interior surfaces of the semi-hemispheres or shells by nubs, stubs of the like. Articles held within the sphere may include bells and treats for pets.

8 Claims, 9 Drawing Sheets

(51) Int. Cl.
*A63B 57/20* (2015.01)
*A63B 47/04* (2006.01)
*A63B 71/06* (2006.01)
*A63B 102/32* (2015.01)
*A63B 102/02* (2015.01)

(52) U.S. Cl.
CPC ..... *A63B 2225/50* (2013.01); *A63B 2225/605* (2013.01)

(56) References Cited

U.S. PATENT DOCUMENTS

| | | | | |
|---|---|---|---|---|
| 3,519,273 A * | 7/1970 | Viby | A63H 15/08 | 446/431 |
| 3,945,568 A * | 3/1976 | Bychowski | A47G 33/0854 | 220/4.25 |
| 4,061,256 A * | 12/1977 | Beer | A45C 11/00 | 2/170 |
| 4,063,637 A * | 12/1977 | Danforth | A42B 3/006 | 206/8 |
| 4,396,136 A * | 8/1983 | Stafford, Jr. | A63B 47/001 | 206/315.9 |
| 4,413,762 A * | 11/1983 | Carini | A45F 5/02 | 206/315.9 |
| 4,448,418 A * | 5/1984 | McNeill | A63B 43/04 | 273/123 A |
| 4,779,794 A * | 10/1988 | Moore | D06F 95/002 | 217/122 |
| 4,836,427 A * | 6/1989 | McManus | A45F 5/00 | 224/247 |
| D373,472 S * | 9/1996 | Eaton | D3/234 | |
| 5,556,013 A * | 9/1996 | Mayer | D06F 95/008 | 223/1 |
| 5,713,147 A * | 2/1998 | Johnson | A47G 1/0616 | 40/734 |
| 5,775,559 A * | 7/1998 | Mechanic | B62J 9/003 | 224/421 |
| 5,819,690 A * | 10/1998 | Brown | A01K 15/025 | 119/707 |
| 6,092,489 A * | 7/2000 | Huettner | A01K 15/026 | 119/707 |
| 6,098,571 A * | 8/2000 | Axelrod | A01K 5/0114 | 119/707 |
| D447,110 S * | 8/2001 | Chen | D12/410 | |
| 6,612,946 B1 * | 9/2003 | McClain | A63B 47/00 | 206/315.9 |
| 7,104,222 B2 * | 9/2006 | Tsengas | A01K 15/025 | 119/711 |
| 7,686,740 B1 * | 3/2010 | Chang | A63B 21/4019 | 482/105 |
| D759,969 S * | 6/2016 | Lynch | D3/257 | |
| 2006/0063621 A1 * | 3/2006 | Bell | A63B 47/00 | 473/569 |
| 2008/0085408 A1 * | 4/2008 | Konrad | C08J 7/047 | 428/337 |
| 2014/0096489 A1 * | 4/2014 | Parry | D06F 95/002 | 53/467 |
| 2016/0081305 A1 * | 3/2016 | Williams | A01K 15/026 | 119/709 |
| 2016/0120337 A1 * | 5/2016 | Cruz | A47F 3/145 | 206/457 |

* cited by examiner

SYSTEM FOR HOLDING AND DRYING TENNIS AND OTHER BALLS, AND DOG TOY

CROSS REFERENCE TO RELATED APPLICATION

This application claims the benefit under 35 USC 119(e) of provisional patent application Ser. No. 62/118,968, filed Feb. 20, 2015, which is hereby incorporated by reference in its entirety.

BACKGROUND OF THE INVENTION

Area of Invention (a) Field of Invention

The present invention relates to a utility belt attachment by which one or more tennis balls, golf balls or the like may be held for the purpose of drying the same if they become wet, for transport of such tennis or golf balls, securely holding and covering one or more such articles, before or during practice or the play of a match, and for use as a pet toy.

(b) Prior Art

Devices for the holding of a tennis ball and, to a lesser extent, a golf ball, for the general purpose of keeping tennis balls and the like in a convenient location until such time that their use, whether as a tennis ball or for the entertainment of a pet such as a dog, is needed, has long existed in the art. That is, the prior art known to the inventor includes U.S. Pat. No. 4,061,256 (1977) to Beer et al, entitled Tennis Ball Holder To Be Worn On The Arm. Devices of the category of Beer do not provide any particular function in the drying of a ball that has become wet or saturated and, as such, if a wet tennis ball is inserted into the structure of Beer, moisture will drip therefrom and otherwise render it uncomfortable and inconvenient to use in the contemplated application.

U.S. Pat. No. 4,413,762 (1983) to Carini, entitled Game Ball Holder, teaches a special-purpose strap or holding means for integration into a garment such as tennis shorts or a tennis skirt and, as such, serves largely the same limited purpose as Beer above, that is, it is not suitable for use with a ball which is damp or moist. In fact, it is less suitable than Beer in that the tennis garment into which the ball holding means is integrated will itself become wet due to direct contact with the ball.

U.S. Pat. No. 4,836,427 (1989) to McManus, teaches a so-called Tennis Utility Belt which, fundamentally, relates to a belt placed about the waist of a tennis player and which includes a plurality of elastic tennis ball retention cages attached thereto. However, by encirclement of the waist by the tennis utility belt, the tennis balls, if wet or moist, will affect the tennis garment worn by the player thereby eventually causing discomfort and, actually, at a level which is a multiple of that in the case of Carini, discussed above.

In view of the above, it may be appreciated that a need exists for a tennis, golf or other article holder which can be held whether or not the article becomes wet and which is less likely to induce dripping or the like onto the clothing of a user thereof. While the complete elimination of dripping or escape of moisture is not possible if the ball or article is to effectively dry over a period of time, the present invention presents a system in which a tennis ball, golf ball, rubber ball of the type which dogs enjoy chewing upon or other article may be stored conveniently upon a belt loop, key chain, back pack, hand bag or other such article and then conveniently opened at the convenience of the user or dog owner when access to the article is desired.

SUMMARY OF THE INVENTION

The inventive ball, sphere or article holding, transport and cover system includes a first hollow semi-hemisphere or shell formed of a resilient material and having therein a plurality of apertures, the semi-hemisphere or shell including a first hinge element and, diametrically opposed therefrom, a selectable closure means. The system also includes a second hollow semi-hemisphere or shell formed of a resilient material and also having therein a plurality of apertures, the second semi-hemisphere or shell including a second hinge element which is complementally proportioned, disposed and engagable relative to said first hinge element. Diametrically opposed therefrom is a second closure means which is complementally, and press- or snap-fittably, engagable by the opposing closure means of said first semi-hemisphere or shell. Closure between the responsive closure means may also be assured by the use of a ring-like element passing between complementally disposed apertures within and between opposing closure means. Provided upon interior surfaces of each semi-hemisphere or shell are integral offsets proportioned for the engagement of a ball or other article placed within the system. Bells or a GPS may also be provided within the system or shells so that a dog wearing the system may be tracked if he were to run off. The ring-like element comprises a release lock by which the system may be attached to a dog collar, belt, wall hook, back pack, or hand bag of a user of the system.

It is therefore an object of invention to provide a spherical, golf or tennis ball drying system of the above type for any article held therein.

It is another object to provide a ball or article holding system of the above type in which the evaporation of moisture thereof will occur in a manner which is efficient but not inconvenient or uncomfortable to a user of the system.

It is a further object of the invention to provide a system of the above type which is pleasing in appearance to both the user and any animal, such as a pet, with which the system may be used.

It is still another object to provide a system of the above type that may be readily attached to a dog collar, a belt, belt loop, key chain, back pack, hand bag or other such article.

It is yet another object to provide a system of the above type that may hold pet treats or bells by which a pet can be tracked if necessary when the system is attached to a dog collar. It is a still further object to provide a system of the above type which may, itself, be used as a dog or pet toy both on the ground and in a lake.

The above and yet other objects and advantages of the of the present invention will become apparent from the hereinafter set forth Brief Description of the Drawings, Detailed Description of the Invention and Claims appended herewith.

DETAILED DESCRIPTION OF THE INVENTION

The present invention is characterized by a first hollow resilient semi-hemisphere 10 and a second hollow resilient semi-hemisphere 12, each of equal diameter. As may be further noted in FIG. 1, each semi-hemisphere is provided with a respective hinge part 14 in the case of the first element 10, and in the case of a second part 16, a screw, pin or axle 18. The first hinge part 14 is complementally engagable by channels 20 of the second hinge part 16, such that the screw, pin or axle 18 of first hinge part may be readily positioned into channel 20 of the second hinge part 16.

Figure 1:
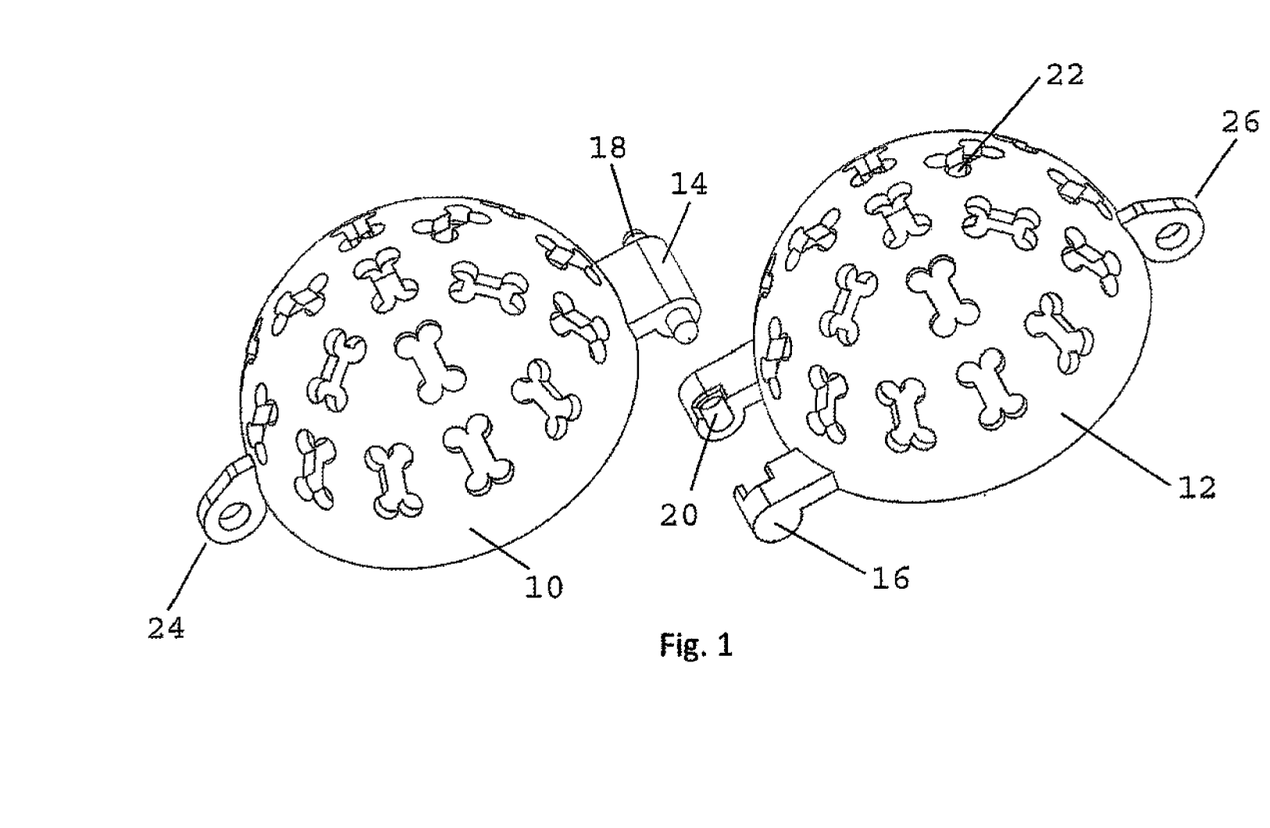
FIG. 1 is a top view showing the respective hollow semi-hemispheres of the present system.

FIG. 1 also shows the inclusion of a multiplicity of apertures 22 which, in an application involving the use of a tennis ball, golf ball, rubber ball or the like with a pet such as a dog, may each take the form of dog bone or the like. The apertures, in aggregate, occupy about 20% of surface area of the two semi-hemispheres, providing necessary breathability to the system. Alternatively, or in addition, a golf ball, bells, dog treats or a GPS may also be placed in the semi-hemispheres 10/12. The entire system may itself be used as a pet toy, including use in a body of water if the article contained therein has positive buoyancy.

Figure 2:
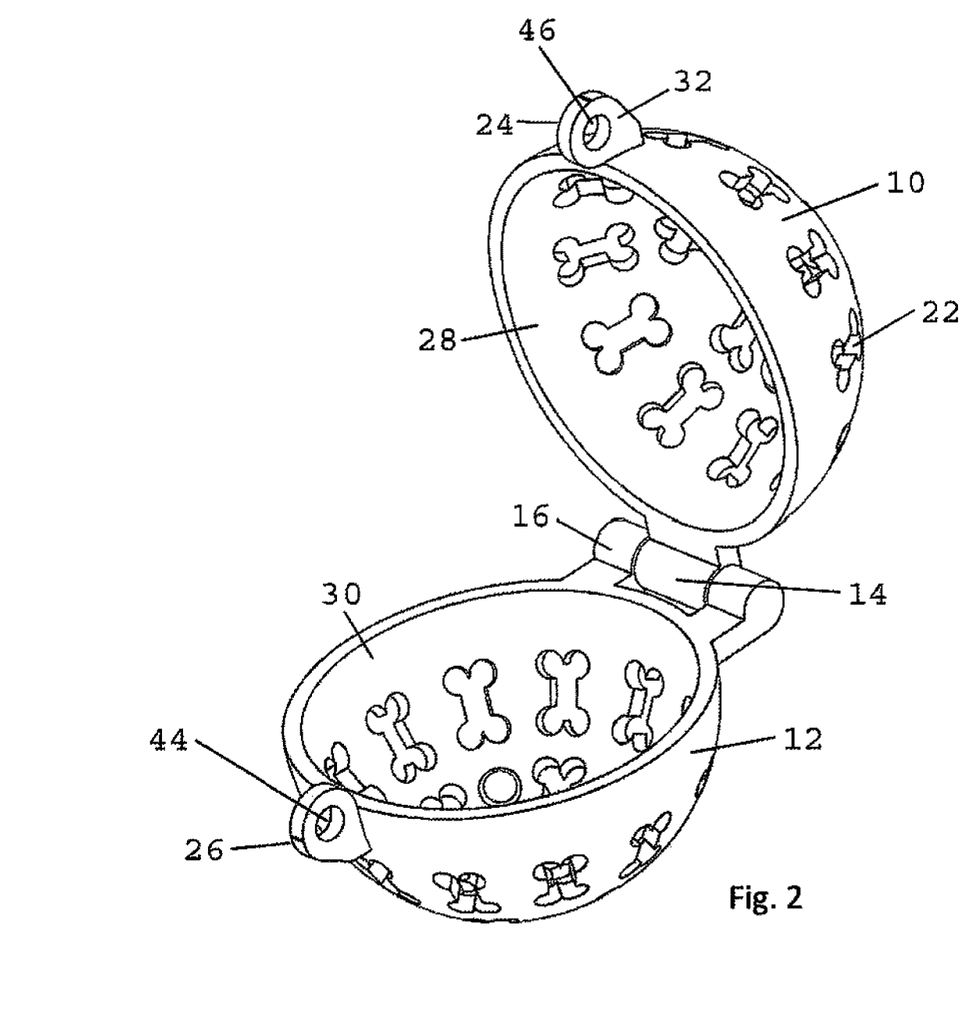
FIG. 2 is an assembly view showing the respective semi-hemispheres connected along their respective hinge elements.

Said semi-hemispheres, after attachment by their respective hinge parts 14/16 are shown in FIG. 2. Therein may also be seen complemental closure elements 24 and 26 which, upon the respective circumferences 28 and 30 of the respective semi-hemispheres 10/12, are longitudinally located close enough to each other such that the lateral sides 32 thereof produce a pressure or snap fit contact with each other. Also shown are apertures 44 and 46 within respective closure elements 24 and 26.

Figure 3:
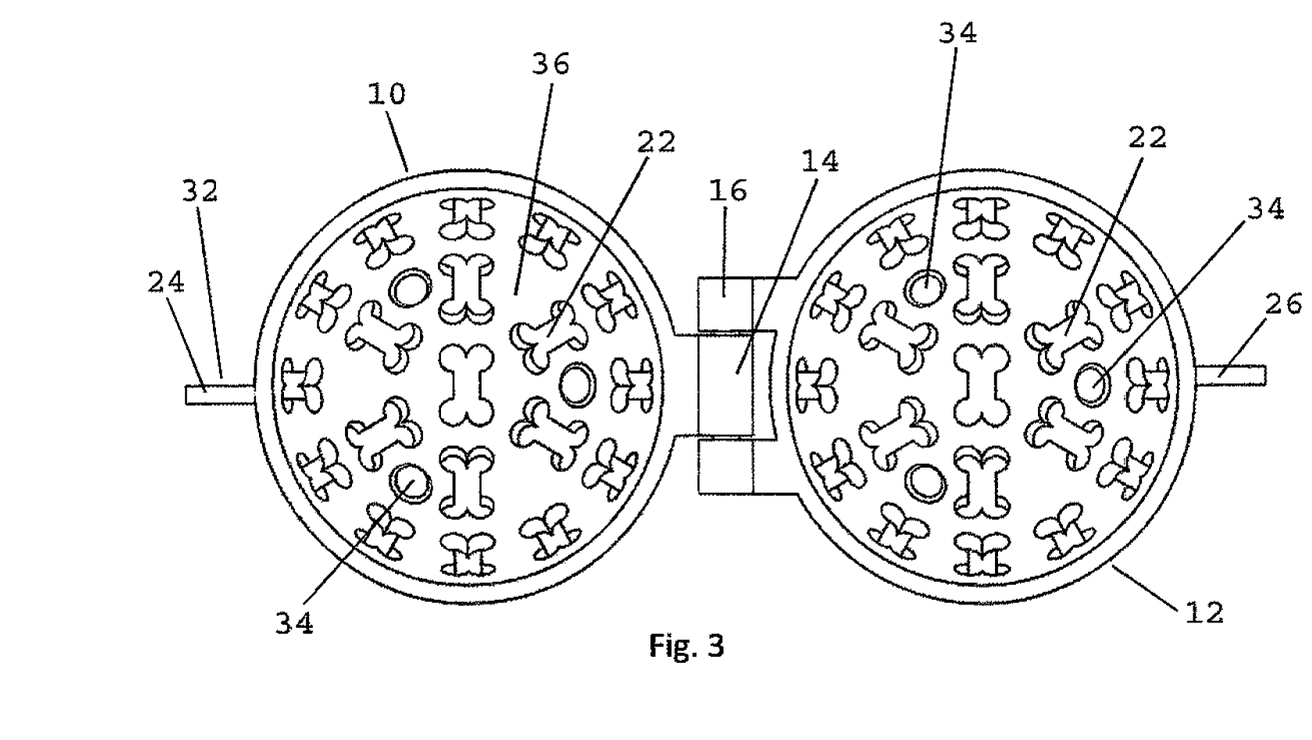
FIG. 3 is an internal fully open view of the system in which are shown internal offset elements separating the held ball from the interior surface of the structure.

The structure of FIG. 2, when fully opened, may be seen from its interior in FIG. 3. Shown therein are offset elements 34 in the nature of knobs or stubs, the function of which is to assure that a spherical object placed therein will remain offset from internal walls 36 of the respective semi-hemispheres, thereby preventing most of the moisture or dampness associated with the balls, including golf balls, from uncontrollably dripping from the article while some moisture will be retained on the inner walls by the effect of surface tension, that is, causing a controlled release of moisture. In many cases, where, for example, a tennis or golf ball is simply damp or wet, evaporation of the moisture thereof will occur entirely internally to the spherical article holder because of the function of offsets 34 and of said surface tension. An appropriate polymer having osmotic properties may be selected for this purpose, as may one having a high molecular surface energy close to that of water to which moisture will thereby be attracted.

Figure 4:
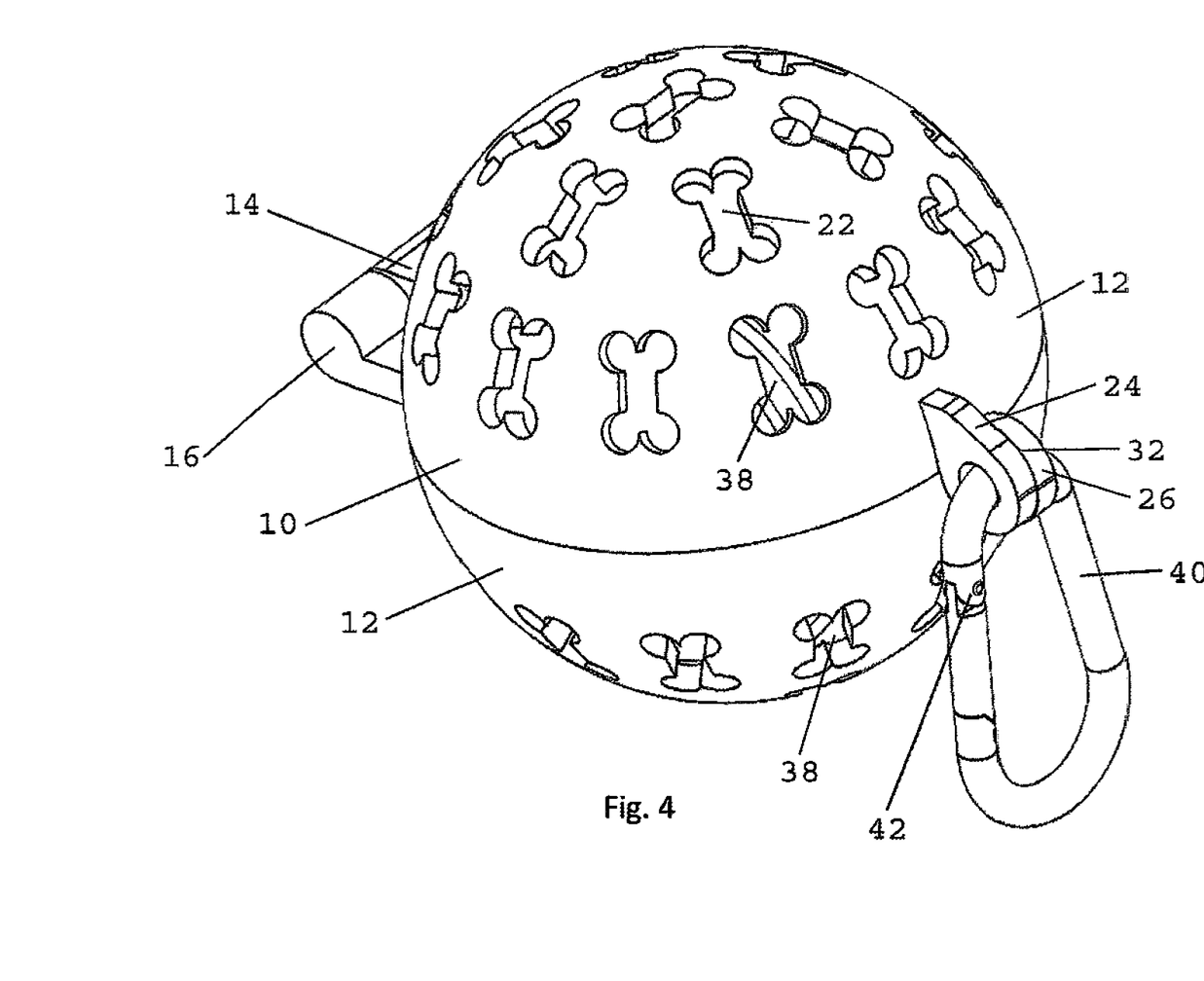
FIG. 4 is a perspective assembled view of the system showing the use of an elongate ring to secure the snap-fittable elements of the system together.

The system, when completely closed and engaging a ball 38, is shown in FIG. 4. Therein may also be seen the manner in which closure elements 24 and 26 may be more reliably engage the system through the use of an elongate ring 40 which may be selectably opened and closed, as may be desired, by the use of a lever lock 42.

Figure 5:
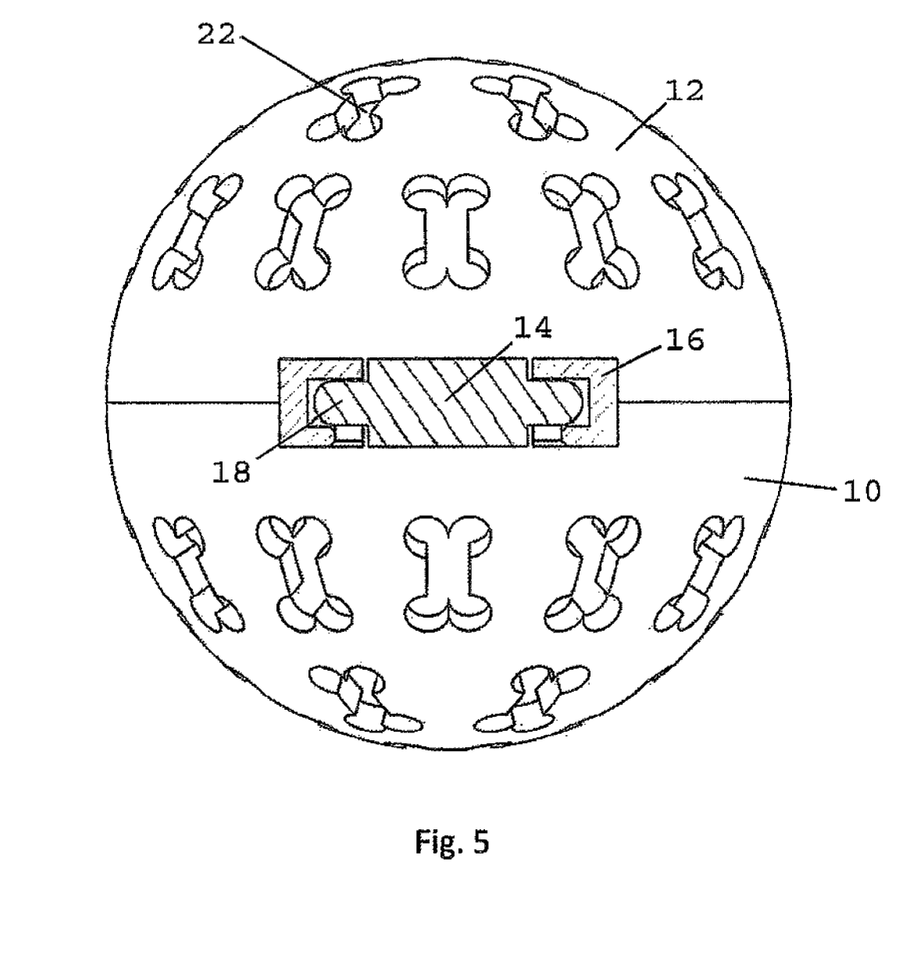
FIG. 5 is a rear view of FIG. 4, taken through a cross-section of the hinge parts of the system through a common axis thereof.

In FIG. 5 is shown a rear plan view of the inventive system in which the hinge parts 14 and 16 are shown in complemental relationship and through the axle 18 in contact with each other. It is noted that various types of screws and pins may be used as axle 18.

Figure 6:
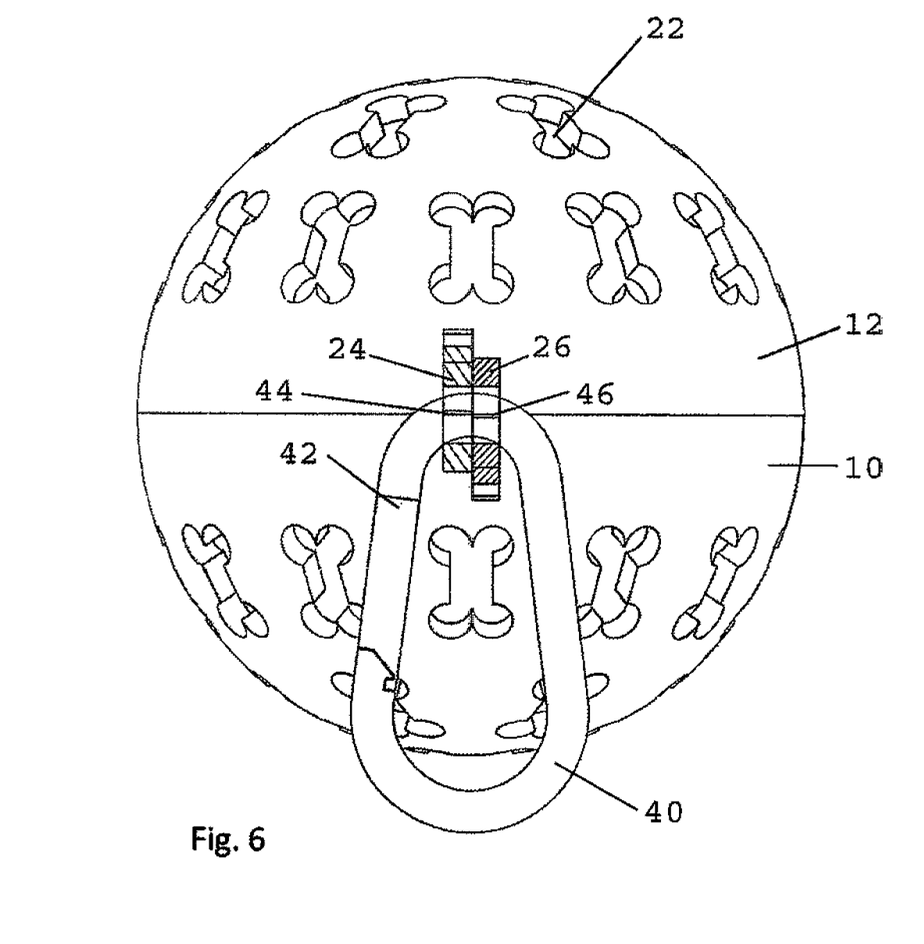
FIG. 6 is a front view of the article of FIG. 4, including a cross section taken through the snap-fit elements of the respective semi-hemispheres.

FIG. 6 is a front view of the view of FIG. 4, showing in cross-section pressure fit closure elements 24 and 26 and the manner in which ring 40 may be used to secure said elements 24 and 26 together when the ring is passed through a commonly aligned apertures 44 and 46 which thereby form a single aperture. See also FIG. 2.

Figure 7:
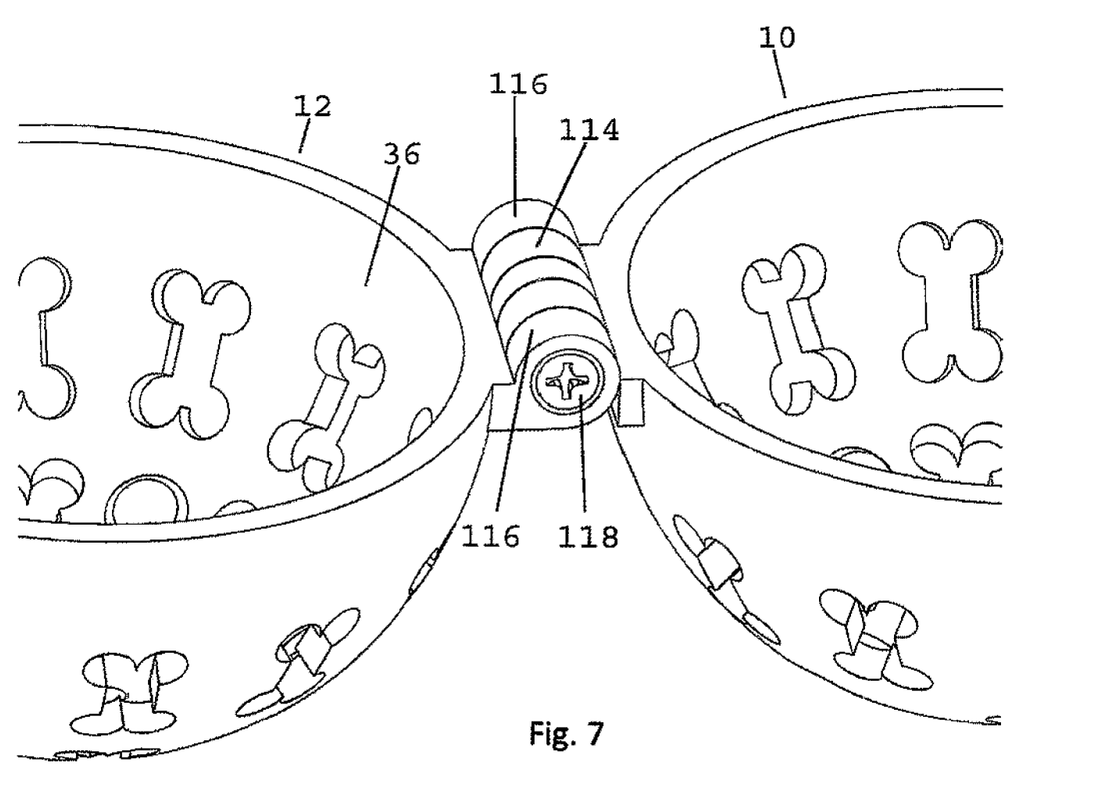
FIG. 7 is a view showing the use of a steel bolt and locknut as an axis of the hinge structure.
Figure 8:
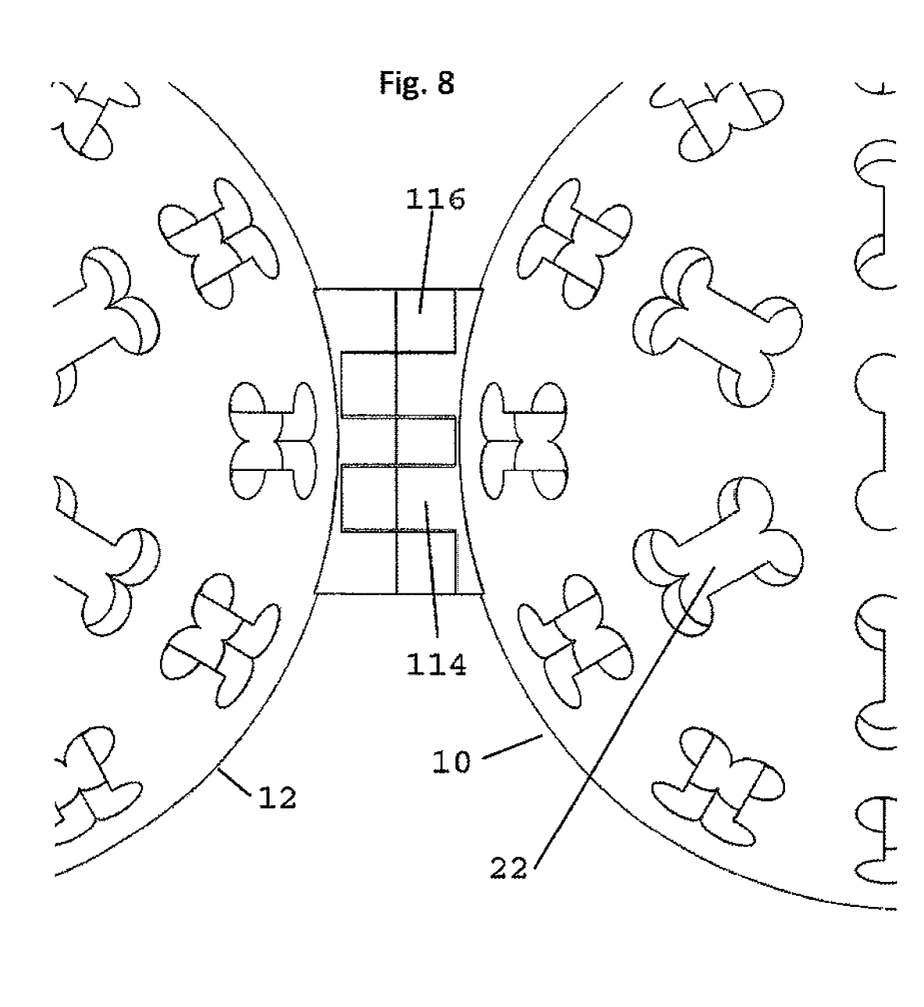
FIG. 8 is a view, similar to FIG. 3, said view including an obverse view of the hinge structure of FIG. 7.

In FIG. 7 is shown the use of either a screw or locknut bolt 118 between hinge parts 114 and 116. FIG. 8 is an obverse view of the hinge of FIG. 7.

Figure 9:
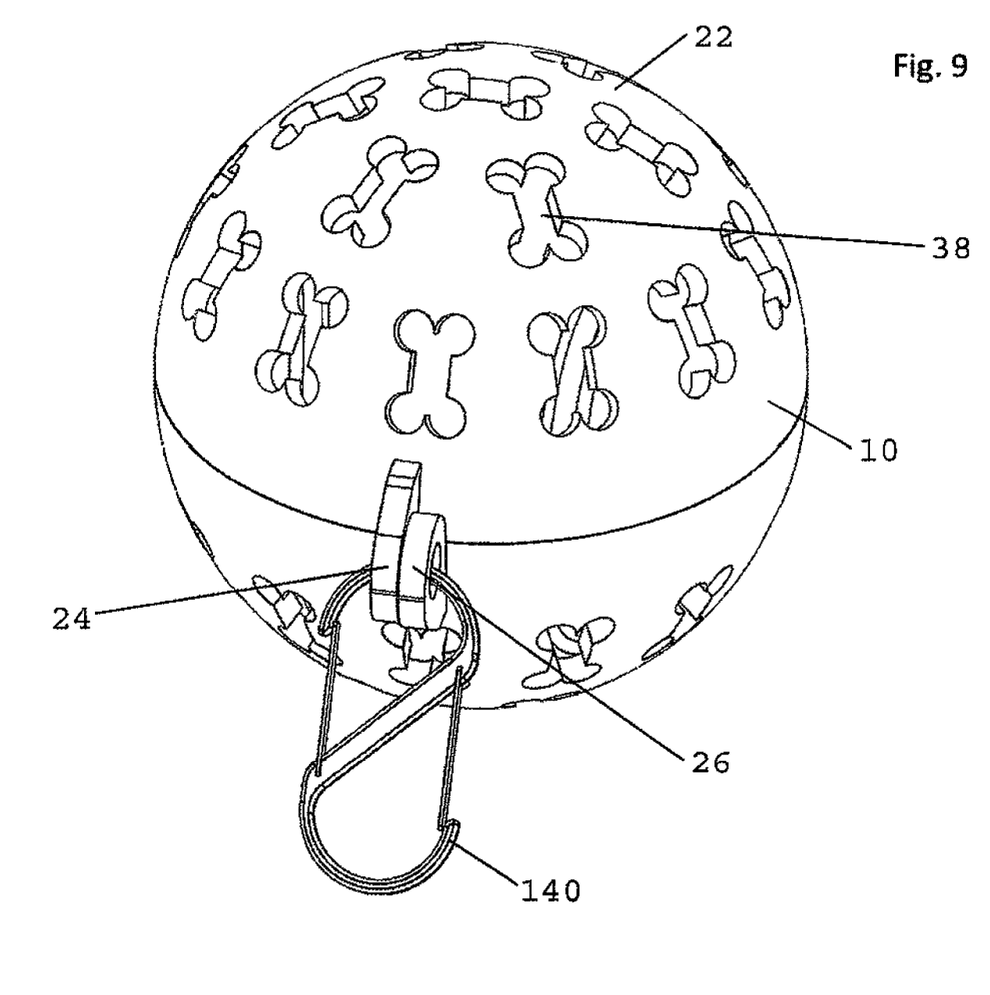
FIG. 9 is a perspective view similar to FIG. 4 but showing the use of a S-binder type lock.

In FIG. 9 is shown the use of an S-binder or small carabineer lock 140 in lieu of the lock 40/42 shown in FIG. 6.

It is noted that the entire system, above discussed, may be employed as a dog toy that bounces about irregularly as a function of the size, density and geometry of the article therein, and may float if said article possess a positive buoyancy.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A spherical ball holder configured to hold, dry and transport a ball, also usable as a pet toy, comprising:

(a) a first hollow hemisphere and a second hollow hemisphere of an equal diameter; a circumferential peripheral edge around an open end of each respective hemisphere; and each respective hemisphere having a central axis;

said first hollow hemisphere formed of a resilient material and having therein a plurality of apertures distributed throughout the first hemisphere, said first hemisphere including a first hinge part extending from the peripheral edge and, diametrically opposed therefrom, a first closure element;

said second hollow hemisphere formed of a resilient material and having therein a plurality of apertures distributed throughout the second hemisphere, said second hemisphere including a second hinge part complementally disposed to or about and connected with said first hinge part and, opposed therefrom, a second closure element complementally engageable with said first closure element; the plurality of apertures in both hemispheres providing breathability of the spherical ball holder when said hemispheres are in a closed position; and (b) a plurality of integral offset elements in a form of round knobs or round stubs distributed individually upon an interior surface of each of said hemispheres, disposed around said central axis of each respective hemisphere and distanced from said peripheral edge of each respective hemisphere with at least one row of the apertures positioned between said peripheral edge and said offset elements, and the length of at least a portion of the offset elements sufficient to maintain a ball held within the spherical ball holder offset from internal walls of the hemispheres thereby allowing air to circulate and causing controlled release of moisture;

wherein a common aperture forms by an opening in each of the first and the second closure elements when the hemispheres are in the closed position, thereby the spherical ball holder is configured to be attached to a ring-like element through the common aperture for carrying the ball held therein using the ring-like element.

2. The spherical ball holder as recited in claim 1, in which said closure elements define a pressure fittable engagement with each other.

3. The spherical ball holder as recited in claim 1, further comprising a tennis ball held within the spherical ball holder.

4. The spherical ball holder as recited in claim 1, further comprising:

the ring-like element proportioned to fit within and through said common aperture.

5. The spherical ball holder as recited in claim 4, in which the ring-like element comprises a release lock.

6. The spherical ball holder as recited in claim 5, in which the ring-like element is configured to attach to a dog collar, wall hook, back pack, belt of a user-owner or hand bag of a user.

7. The spherical ball holder as recited in claim 4, in which said ring-like element defines a S-binder lock.

8. The spherical ball holder as recited in claim 1, in which said first and second hinge parts include:

a bolt and locknut connection therebetween.

* * * * *